United States Patent [19]
Ruddick

[11] 3,773,163
[45] Nov. 20, 1973

[54] KEG FEEDING CONVEYORS

[75] Inventor: Maurice Ruddick, Kent, England

[73] Assignee: Burnett & Rolfe Limited, Kent, England

[22] Filed: July 6, 1971

[21] Appl. No.: 159,926

[30] Foreign Application Priority Data
July 15, 1970 Great Britain .................. 34386/70

[52] U.S. Cl. ................................................ 198/21
[51] Int. Cl. ............................................ B65g 47/00
[58] Field of Search ................. 198/21, 24, 81, 218; 214/1 BB, 6 DK

[56] References Cited
UNITED STATES PATENTS

| | | | |
|---|---|---|---|
| 3,370,720 | 2/1968 | Schickle | 198/81 |
| 3,414,138 | 12/1968 | Junemann | 214/6 DK |
| 3,231,100 | 1/1966 | Faeber | 214/6 DK |
| 2,799,414 | 7/1957 | Streckfuss | 198/24 |
| 3,469,608 | 9/1969 | Kirchner | 214/1 BB |

FOREIGN PATENTS OR APPLICATIONS 463,965 3/1950 Canada ............................. 198/24

Primary Examiner—Richard E. Aegerter
Attorney—Holcombe, Wetherill & Brisebois

[57] ABSTRACT

A keg processing plant having a number of processing stations positioned alongside a main keg feeding conveyor has a number of keg removing devices, one for each processing station, positioned along and beneath the conveyor and adapted to move sideways off the conveyor kegs which have an upstanding rim at one or both of its ends. Each keg removing device comprises a finger which has a rest position at one side of the conveyor at or below the level of the upper surface of the conveyor and which is movable from the rest position upwards to project beyond the upper surface of the conveyor, laterally away from the side of the conveyor, and finally back to the rest position, so that when a keg standing on a rimmed end with an edge overhanging the side of the conveyor is carried adjacent the device, upward movement of the finger engages it within the overhanging rim and outward movement pulls the keg sideways off the conveyor. The plant may be provided with mechanisms and a series of switches whereby operation of the plant is fully automatic.

8 Claims, 5 Drawing Figures

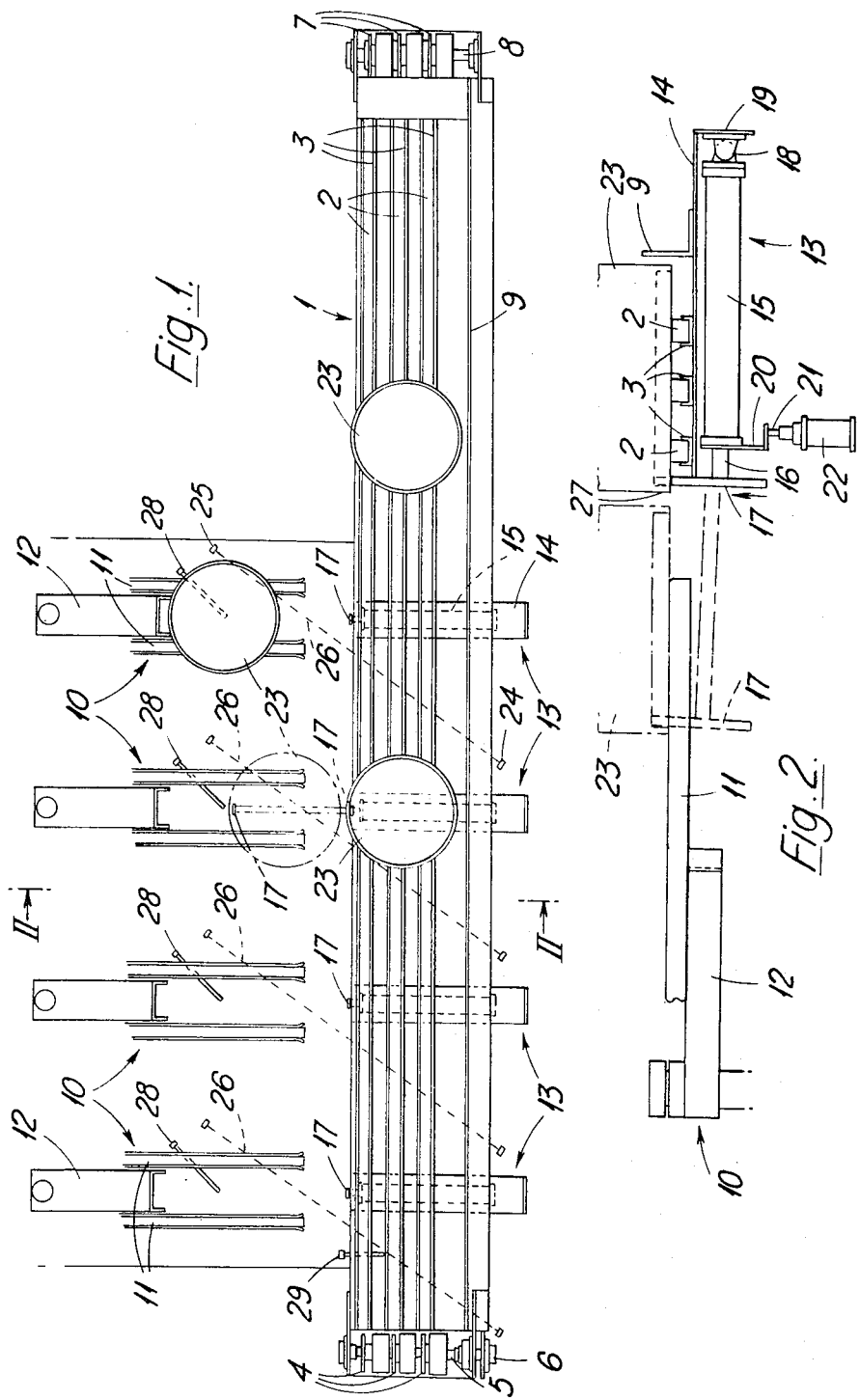

KEG FEEDING CONVEYORS

This invention relates to conveyors for carrying kegs which are used to contain beer or other beverages to the various stations in a keg processing plant, for example a washing station, a filling station and a dispatch station. Each of these stations is often arranged at the side of a main feed conveyor and it is therefore necessary to move the kegs sideways off the conveyor to the processing station as desired. Until now, this has been done by means of apparatus which engages the keg to be removed on its side remote from the processing station and pushes the keg off the conveyor towards the processing station. The apparatus is naturally positioned above the level of the conveyor and it sometimes happens that when the pushers are being retracted after removing a keg they are fouled by the next keg which is being carried by the conveyor. Also, when a keg is being pushed from behind there is a possibility of it tipping over, and furthermore, it is normally necessary to adjust the pushing apparatus to the size of the keg being handled.

Nearly all the kegs in use nowadays have an upstanding rim at both the top and bottom ends, and it is this fact which has led to the present invention which enables kegs to be moved sideways off a conveyor without the disadvantages of the conventional apparatus described above.

According to the present invention, a keg feeding conveyor includes a device for moving sideways off the conveyor kegs having an upstanding rim at one or both ends, the device comprising a finger which has a rest position at one side of the conveyor at or below the level of the upper surface of the conveyor, and which is movable from the rest position upwards to project beyond the upper surface of the conveyor, laterally away from the side of the conveyor, and finally back to the rest position. In use, kegs are placed on the feed conveyor each with an edge overhanging the side of the conveyor on which the removal finger is positioned. When a keg reaches a position above the device, the finger is raised to engage within the overhanging rim of the keg. The finger is then moved laterally outwards and the keg is moved sidways off the conveyor. In use, the finger pulls the keg to a processing station positioned along side the conveyor and at the end of this delivery the finger is lowered so that it clears the rim of the keg as the finger is retracted to its rest position.

The advantage of this arrangement is that there can be no interference by the keg removing mechanism with subsequent kegs on the feed conveyor due to the removal finger being positioned below and to the side of the conveyor, and also, any size of keg can be handled without any adjustment of the feeding mechanism so long as each keg is initially correctly positioned on the feed conveyor, i.e. with its rim overhanging the edge of the conveyor. Also, because the kegs are fed by effectively being pulled from the leading edge, rather than being pushed from the back as with conventional apparatus, there is less likelihood that a keg will tip over when it is being removed from the conveyor.

Preferably, the finger is moved under the control of two pneumatic or hydraulic rams, one of which acts vertically to raise and lower the finger and the other of which acts horizontally to move the finger laterally away from the conveyor and back again. Alternatively, instead of the vertically acting ram, the finger may be caused to move upwards and downwards at the beginning and end respectively of the laterally outward stroke by means of fixed guides which are engaged by the finger as the horizontally acting ram is extended.

Preferably, the keg removing device is set in operation by means of a switch, comprising for example a photoelectric transmitter and receiver positioned on opposite sides of the conveyor so that a light beam is passed between them, which is actuated by a keg on the conveyor when it reaches a predetermined position adjacent the device. With the keg removing device being started automatically, preferably it also operates automatically when set in operation, to raise the finger, move it laterally away from the side of the conveyor, lower the finger, and return it to the side of the conveyor, there being a switch which is actuated when the finger has been moved away from the conveyor by a predetermined amount to cause the finger to be lowered and returned to the side of the conveyor.

Usually, in a keg processing plant, the conveyor will be used to feed kegs to a number of processing stations positioned along side the conveyor. The conveyor then has a corresponding number of keg removing devices arranged along its length with one opposite each processing station. When the kegs are fed automatically to the processing station, preferably there is a switch associated with each processing station and its corresponding keg removing device which is sensitive to the presence of a keg at the processing station and which acts to prevent the keg removing device from being operated further until the processing station is ready to receive another keg. Thus, in use, each keg is moved along the conveyor until it becomes opposite the first available washing station which is free to receive a keg, the keg having passed all of the previous washing stations which are occupied without their associated keg removing devices being actuated. However, the keg removing device opposite the free washing station is actuated and the keg is removed to this washing station.

In order to cater for the event where a keg may pass completely along the conveyor without any of the washing stations being free to receive it, there may be a recircling conveyor which will return the keg to the beginning of the main feed conveyor, but preferably the conveyor includes means for stopping the conveyor when a keg is carried opposite the last keg processing station and this station is unable to receive the keg due to the presence at the station of an earlier keg, release of the switch at the last processing station, which indicate the passing on of the earlier keg and that the station is ready to receive another keg, causing the keg halted on the conveyor to be removed to the last keg processing station by the last keg removing device and the conveyor to be restarted. The means may include a switch which is positioned downstream from the switch for setting the last keg removing device in operation such that on actuation by a keg the conveyor is stopped with the keg still having its overhanging rim above the finger of the last keg removing device. Alternatively the means may include circuitry associated with the switches controlling the last keg processing station and the last keg removing device so that simultaneous actuation of these switches causes the conveyor to stop.

An example of a keg feeding conveyor in accordance with the present invention is illustrated in the accompanying drawings in which:

FIG. 1 is a diagrammatic plan view of the conveyor having four pneumatically operated keg removing devices positioned at intervals along its length, one for each of four keg processing stations alongside the conveyor;

FIG. 2 is a diagrammatic elevation of the apparatus shown in FIG. 1 taken along the line II—II in FIG. 1 and illustrating one of the keg removing devices;

Figure 3:
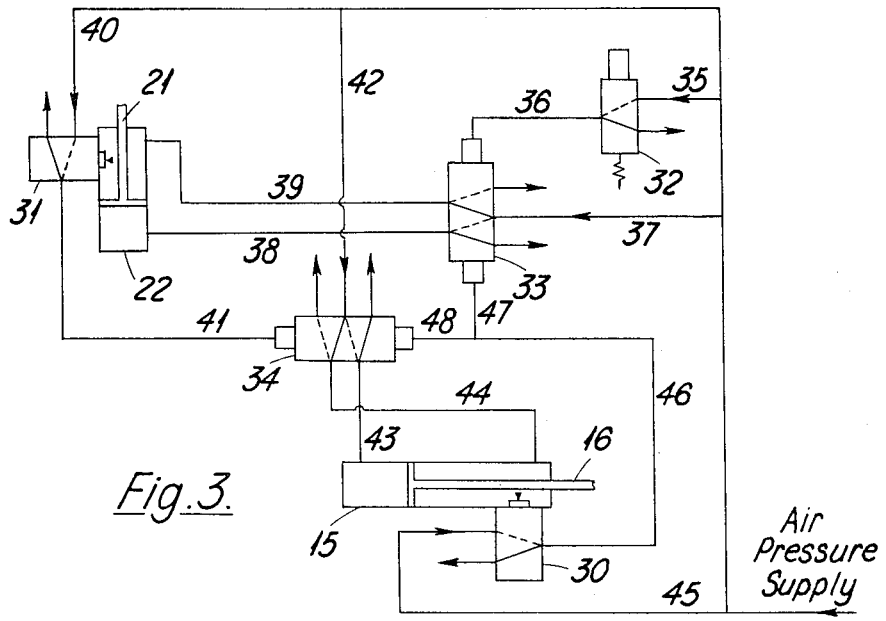
FIG. 3 is a pneumatic control circuit diagram for the keg removing device shown in FIG. 2.

FIG. 1 shows a main keg feeding conveyor 1 comprising three continuous tracks 2 running in guides 3 which are mounted on the fixed support frame of the conveyor 1. The tracks 2 are moved by means of drive wheels 4 mounted on a drive shaft 5 positioned at one end of the conveyor 1 and driven through a coupling 6 by a motor which is not shown. At the other end of the conveyor 1 the tracks 2 pass around free wheels 7 which are rotatably mounted on an axle 8. A guide rail 9 which projects above the level of the tracks 2 is fixed to the frame of the conveyor along the length of one side.

Positioned alongside the conveyor 1 on the opposite side from the guide rail 9 and at intervals along its length are four keg washing stations 10. Each of these stations 10 has a twin track lead-in conveyor 11 running at right angles to the conveyor 1 and a lifting platform 12 for lifting kegs into engagement with a washing head which is not shown. Positioned in line with each washing station 10 and beneath the conveyor 1 is a keg removing device 13.

Each device 13 comprises a mounting plate 14 which is fixed to the support frame of the conveyor 1 beneath the track guides 3 and which carries beneath it a pneumatic ram 15 which acts substantially horizontally and in a direction perpendicular to that of the conveyor 1. The rod 16 of the pneumatic ram 15 has a vertically extending finger 17 fixed to its end, and when the rod 16 is in its retracted position the finger 17 lies adjacent the side of the conveyor 1. The rear end of the cylinder of the ram 15 is pivotally mounted at 18 to a bracket 19 fixed to the support plate 14, and the forward or rod end of the ram cylinder 15 is connected by a bracket 20 to the rod 21 of a vertically acting pneumatic ram 22. With the rod 21 in its retracted position as well as the rod 16, the finger 17 is held alongside the conveyor 1 with its upper end marginally below the level of the upper surface of the tracks 2 (as shown in FIG. 2).

The operation of the rams 15 and 22 is controlled by the pneumatic control circuit shown in FIG. 3, and is initiated by means of an electrical circuit (not shown) including a photo-electric mechanism which, when operative, senses when a keg 23 reaches a position on the conveyor 1 in line with the keg removing device 13 and the associated washing station 10. The photoelectric mechanism comprises a transmitter 24 and a receiver 25 positioned as shown in FIG. 1 so that a light beam 26 is directed diagonally across both the conveyor 1 and the conveyor 11 of the washing station 10.

In operation, kegs 23 are fed in a conventional manner onto the conveyor 1 upstream from the washing stations 10. The kegs 23 are stood on end the correct way up for being received by the washing stations 10 and with part of the rim 27 at the end on which they stand overhanging the edge of the conveyor 1 on the side of the washing stations 10. The kegs 23 are thus carried in this fashion along the conveyor 1 towards the washing stations 10. When the keg 23 becomes opposite a washing station 10 which does not have a keg on its lead-in conveyor 11, it breaks the photoelectric beam 26 and triggers the electrical and pneumatic circuits to operate the corresponding keg removing device 13 automatically. The rod 21 of the ram 22 is extended, raising the rod end of the ram 15 and hence the finger 17 by an amount which moves the upper end of the finger 17 into engagement within the overhanging rim 27 of the keg 23 (see FIG. 2). The ram 15 is then extended so that the rod 16 moves laterally away from the side of the conveyor 1 causing the finger 17 to pull the keg 23 sideways off the conveyor 1 and onto the lead-in conveyor 11 of the washing station 10 as shown in dotted lines in FIGS. 1 and 2. The rams 22 and 15 are then retracted to disengage the finger 17 from the rim of the keg 23 and to move it back to its rest position beside the conveyor 1.

The lead-in conveyor 11 carries the keg 23 to a waiting position, shown in the first washing station in FIG. 1, where it remains until the washing head and its lifting platform 12 are ready to receive it. While the keg travels to this position the photoelectric beam 26 remains broken and the electrical start circuit is therefore not reset and a further keg cannot be fed from the conveyor 1 to this station 10. In case kegs are used which have a diameter which is small enough for a keg to clear the photoelectric beam 26 when in the waiting position on the lead-in conveyor 11, each washing station is fitted with an auxiliary switch 28 which is sensitive to any keg which may be at the waiting position on the conveyor 11. The switch 28 is connected into the electric start circuit and is operative so that the circuit is not set to trigger the keg removing device 13 until both the photoelectric beam 26 and the switch 28 are free. Thus, if the waiting positions of the first two washing stations 10 are occupied as shown in FIG. 1, the next keg 23 on the conveyor 1 will pass both of these two stations 10 without triggering the corresponding keg removing devices 13 and will be removed by the third device 13 to the third washing station 10.

In case it should happen that the waiting stations of all four washing stations are occupied as a keg passes along the conveyor, there is a switch 29 positioned so that it is actuated by the keg immediately after it has passed through the last photoelectric beam 26 without the last keg removing device 13 being actuated. This switch 29 operates to stop the conveyor 1, and having been actuated the conveyor remains halted until the last washing station 10 is free to receive the keg 23 which has been stopped on the conveyor opposite this station. Because this keg lies in the path of the photoelectric beam 26, the beam will not be freed to reset the electrical start circuit when the keg at the waiting position on the washing station 10 moves out of the beam. Thus, the switch 29 is also arranged to reset this part of the electrical start circuit when it is actuated, so that when the keg at the washing station moves from the waiting position to the lift platform 12, the freeing of the switch 28 is sufficient for the corresponding removing device 13 to be actuated. The keg is then moved from the conveyor 1 to the lead-in conveyor 11 of the washing station, freeing the switch 29 and allowing the conveyor 1 to restart.

The conveyor stop switch 29 may be moved in position along the conveyor so that it operates in conjunction with whichever of the washing stations it is desired. In this way the apparatus can be operated with a reduced number of washing stations as desired.

As an alternative to the use of the stop switch 29, there may be provided a recircling conveyor which feeds excess kegs which reach the downstream end of the conveyor 1 back to the beginning of the conveyor 1 so that they are refed past the washing stations 10. However, this arrangement is bulky and costly and the use of the stop switch 29 is preferred.

The pneumatic control circuit shown in FIG. 3 comprises the two pneumatic rams 15 and 22 fitted with pressure switches 30 and 31 respectively which are actuated at the end of the stroke of the corresponding ram, a solenoid operated two-way air valve 32, and a pair of four-way air operated spool valves 33 and 34. The exit arrows from the switches and valves 30 and 34 indicate outlet for exhausting air to the atmosphere, and the full lines within these switches and valves indicate their settings when the keg removing device 13 under control is inoperative and the finger 17 is at its rest position. In operation, when a keg 23 trips the electrical start circuit by breaking the photoelectric beam, an electrical pulse is given to the solenoid operated valve 32 which alters its setting and allows air under pressure from the supply to pass from a line 35 through the valve 32 and a line 36 to the spool valve 33. This air pressure alters the setting of the valve 33, and with the solenoid becoming de-energised the valve 32 returns to its original setting. However, with the valve 33 in its new setting air passes from the supply via a line 37, the valve 33 and a line 38 to the ram 22 to cause the rod 21 to extend, the pressure on the other side of the ram piston being exhausted through a line 39 and the valve 33. When the rod 21 has been extended by its predetermined amount, the extending pressure operates the switch 31 to change its setting. This allows air from the supply to pass via lines 40 and 41 to the spool valve 34 to change its setting. Air then passes via lines 42 and 43 to extend the rod 16 of the ram 15, pressure being exhausted from the other side of the ram piston through a line 44. When the rod 16 has been extended by its predetermined amount, the extension pressure operates the switch 30 to change its setting so that air from the pressure supply is admitted through a line 45 and the switch 30 to a line 46. This line 46 is connected to both the spool valves 33 and 34 through branches 47 and 48 respectively. However, because the valve 34 is still pressurised through the line 41, only the setting of the valve 33 is changed at this instant. The setting then assumes the full line position shown in FIG. 3 and air pressure is supplied to the rod side of the piston of the ram 22 through lines 37 and 39 and the cylinder is exhausted through the line 38. This immediately allows the pressure switch 31 to revert to its exhaust setting and with the resultant loss of pressure through the line 41 the spool valve 34 reverts to its rest setting due to the pressure in the line 48. Thus, the cylinder of the ram is exhausted through the line 43 and this allows the switch 30 to revert to its exhaust position. The rod side of the piston of the ram 15 is simultaneously pressurised through the lines 42 and 44. Hence, the rods 21 and 16 of the rams 22 and 15 are retracted automatically to their rest positions, leaving the circuit ready for another cycle when the electrical start circuit is next tripped.

Figure 4:
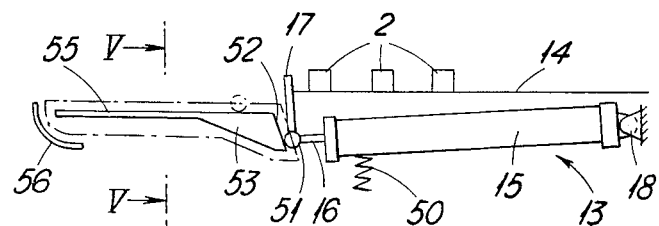
FIG. 4 is a diagrammatic view of an alternative form of keg removing device.
Figure 5:
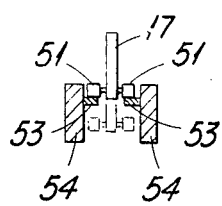
FIG. 5 is a section taken on the lines V—V in FIG. 4 showing the finger during operation of the device.

In the alternative form of keg removing device 13 shown in FIG. 4, there is still a substantially horizontally acting pneumatic ram 15 which is pivotally mounted at 18 at its rear end, but instead of having its forward end acted upon by a vertically acting ram, it is merely biassed into a rest position by a coil spring 50. The rod 16 of the ram 15 still carries at its leading end of the vertically extending finger 17, which in the rest position of the ram 15 lies with its upper end just below the level of the upper surface of the conveyor tracks 2. However, mounted on opposite sides of the finger near its lower end are a pair of ball bearings 51, the outer races of which abut steeply inclined faces 52 of a pair of guide strips 53 fixed to two stationary side supports 54. On actuation of the keg removing device 13, the rod 16 of the ram 15 is extended. Immediately the ball bearings 51 ride up the faces 52 of the guides 53, causing the rod end of the ram 15 to pivot upwards agains the action of the spring 50 and hence lifting the finger 17 above the level of the conveyor tracks 2 and into engagement with the overhanging rim 27 of the keg to be removed. At the top of the inclined faces 52 the ball bearings 51 ride on horizontal surfaces 55 as the ram 16 is extended to push the keg off the conveyor 1. At the end of the ram stroke, a pressure switch fitted to the ram similarly to the switch 30 described in FIG. 3 causes the pneumatic supply to the ram 15 to be reversed and the rod 16 to be retracted. However, immediately before this point is reached the ball bearings 51 run off the guides 53 and the spring 50 is free to pull the ram 15 downwards about the pivot point 18. This pulls the finger 17 down out of engagement from the rim of the keg, and the downward movement is arrested by the ball bearings 51 engaging a curved guide plate 56 which guides them into the path taken as the finger is retracted to the rest position. The locus of the path of the ball bearings 51 is shown in chain dotted lines in FIG. 4.

I claim:

1. A keg processing plant comprising a main conveyor for feeding kegs having a projecting rim at at least one end, said main conveyor having at least one endless flexible member with two substantially parallel longitudinal edges and an upper surface on which said kegs are supported on rimmed ends with a portion of said rims extending laterally beyond at least one of said longitudinal edges, a number of keg processing stations positioned alongside said main conveyor, each station including a secondary parallel twin track conveyor extending laterally with respect to said main conveyor, and a number of keg removing devices spaced apart along said main conveyor, each keg removing device corresponding with one of said keg processing stations and comprising a finger mounted to occupy a rest position adjacent said at least one edge but below said supporting surface of said main conveyor and means for moving said finger upwardly from said rest position to a second position in which it projects above said surface between said at least one longitudinal edge and said laterally extending rim portion of a keg, and thence laterally away from said main conveyor to pull said keg off said main conveyor onto said secondary conveyor of said corresponding keg processing station, said plant also including a series of switches each associated with one of said keg removing devices and arranged for actuation to set in operation said keg removing device by a keg when said keg is carried by said main conveyor into a predetermined position adjacent said keg removing device, detector means associated with each keg processing station and said corresponding keg removing device for sensing the presence of a keg at said processing station and preventing said corresponding keg removing device from operating further until said processing station is ready to receive another keg, and means for stopping said main conveyor when a keg is carried by said main conveyor adjacent the last of said keg processing stations and said last processing station is unable to receive said keg due to the presence at said last processing station of an earlier keg, wherein said keg halted on said conveyor is removed to said last keg processing station by the last keg removing device and said main conveyor is restarted when said detector means associated with said last processing station indicates the passing on of said earlier keg and that said last processing station is ready to receive said halted keg.

2. A conveyor as claimed in claim 1, wherein said means for moving said finger includes a pair of fluid pressure operated rams, means mounting one of said rams for vertical action to raise and lower said finger, and means mounting the other of said rams for horizontal action to move said finger laterally away from said conveyor and back again.

3. A conveyor as claimed in claim 1, wherein said means mounting said horizontally acting ram includes a fixed support, means pivotally connecting the rear end of the cylinder of said horizontally acting ram to said fixed support, and means connecting the forward end of the cylinder of said horizontally acting ram to said vertically acting ram whereby said forward end is raised end lowered as said vertically acting ram is extended and retracted, there being means mounting said finger on the rod of said horizontally acting ram, and said finger lying in said rest position when said horizontally acting ram and said vertically acting ram are both fully retracted.

4. A conveyor as claimed in claim 1, wherein said means for moving said finger includes a substantially horizontally acting fluid pressure operated ram and fixed guides which are engaged by said finger and cause said finger to move upwards and downwards at the beginning and end respectively of the outward stroke of said ram.

5. A conveyor as claimed in claim 4, including means mounting said finger to the rod of said ram, a fixed support, means pivotally mounting the cylinder of said ram to said fixed support at its rear end to accomodate the upward and downward movements of said finger as said ram is extended and retracted, and spring means biasing the forward end of the cylinder of said ram to a position wherein said finger is in said rest position with said ram fully retracted.

6. A conveyor as claimed in claim 1, wherein said switch comprises a photoelectric transmitter and a receiver positioned on opposite sides of said conveyor and adapted to effect a light beam passing between them, said switch being actuated by interruption of said light beam by said keg when said keg reaches a position wherein said rim overhanging said one side of said conveyor is above said finger.

7. A conveyor as claimed in claim 1, wherein said means for moving said finger includes control means which, once said device is set in operation, causes said finger automatically to rise, move laterally away from said one side of said conveyor, to drop, and to return to said one side of said conveyor, said control means including a switch which is actuated when said finger has been moved away from said conveyor by a predetermined amount to cause said finger to be lowered and returned to said one side of said conveyor.

8. A plant as claimed in claim 1, wherein said means for stopping said conveyor includes a stop switch which is positioned downstream from said switch for setting the last of said keg removing devices in operation, whereby on actuation of said stop switch by a keg said conveyor is stopped with said keg still having said overhanging rim above said finger of said last keg removing device.

* * * * *